United States Patent
Wang et al.

(10) Patent No.: US 9,129,103 B2
(45) Date of Patent: Sep. 8, 2015

(54) AUTHENTICATE A HYPERVISOR WITH ENCODED INFORMATION

(75) Inventors: Lan Wang, Cypress, TX (US); Boris Balacheff, Bristol (GB); Chris I. Dalton, Bristol (GB)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 29 days.

(21) Appl. No.: 13/824,530

(22) PCT Filed: Jan. 28, 2011

(86) PCT No.: PCT/US2011/022814
§ 371 (c)(1),
(2), (4) Date: Mar. 18, 2013

(87) PCT Pub. No.: WO2012/102725
PCT Pub. Date: Aug. 2, 2012

(65) Prior Publication Data
US 2013/0318595 A1    Nov. 28, 2013

(51) Int. Cl.
*G06F 21/44* (2013.01)
*G06F 9/455* (2006.01)
*G06F 21/57* (2013.01)

(52) U.S. Cl.
CPC ............ *G06F 21/44* (2013.01); *G06F 9/45558* (2013.01); *G06F 21/575* (2013.01); *G06F 2009/45587* (2013.01)

(58) Field of Classification Search
USPC ............ 726/16, 2, 21, 36; 713/150, 163, 181; 380/255, 264, 276
See application file for complete search history.

(56) References Cited

U.S. PATENT DOCUMENTS

| | | | |
|---|---|---|---|
| 7,103,529 B2 | 9/2006 | Zimmer | |
| 2009/0064274 A1 | 3/2009 | Zimmer et al. | |
| 2009/0164770 A1 | 6/2009 | Zimmer et al. | |
| 2009/0259845 A1 | 10/2009 | Sutton, II et al. | |
| 2009/0287571 A1 | 11/2009 | Fujioka | |
| 2009/0328195 A1 | 12/2009 | Smith | |
| 2010/0122250 A1 | 5/2010 | Challener et al. | |
| 2011/0246719 A1* | 10/2011 | Knox et al. | 711/118 |

OTHER PUBLICATIONS

Hall, Kylene, et al.; "Trusted Computing and Linuk"; IBM; Jul. 20-23, 2005; pp. 1-22.
HP Trusted Platform Module; pp. 1-2.
Wang. Zhi, et al.; "HyperSafe: A Lightweight Approach to Provide Lifetime Hypervisor Control-Flow Integrity"; North Carolina State University; May 16-19, 2010; pp. 1-29.

* cited by examiner

*Primary Examiner* — Jason K. Gee
*Assistant Examiner* — Sharif E Ullah
(74) *Attorney, Agent, or Firm* — Hewlett-Packard Patent Department

(57) ABSTRACT

Disclosed embodiments relate to authenticating a hypervisor with encoded hypervisor information. In one embodiment, booting firmware 112 includes instructions to determine whether a received hypervisor 108 is an authentic hypervisor. In one embodiment, booting firmware 112 includes instructions to determine whether the received hypervisor 108 is in a selected configuration. In one embodiment, booting firmware 112 includes instructions to determine whether the receive hypervisor 108 is a selected version.

9 Claims, 11 Drawing Sheets

AUTHENTICATE A HYPERVISOR WITH ENCODED INFORMATION

BACKGROUND

An electronic device, such as a notebook computer, may in some cases be capable of running multiple virtual machines, such as where each virtual machine is associated with a different operating system. A hypervisor, also called a virtual machine monitor, may launch and monitor the virtual machines. A hypervisor may execute on a higher privilege level than the operating system because the hypervisor may control the operating system, such as controlling which operating system is executed. As a result, a security problem that threatens the hypervisor may threaten the virtual machines as well.

BRIEF DESCRIPTION OF THE DRAWINGS

In the accompanying drawings, like numerals refer to like components or blocks. The drawings describe example embodiments. The following detailed description references the drawings, wherein.

DETAILED DESCRIPTION

Figure 1:
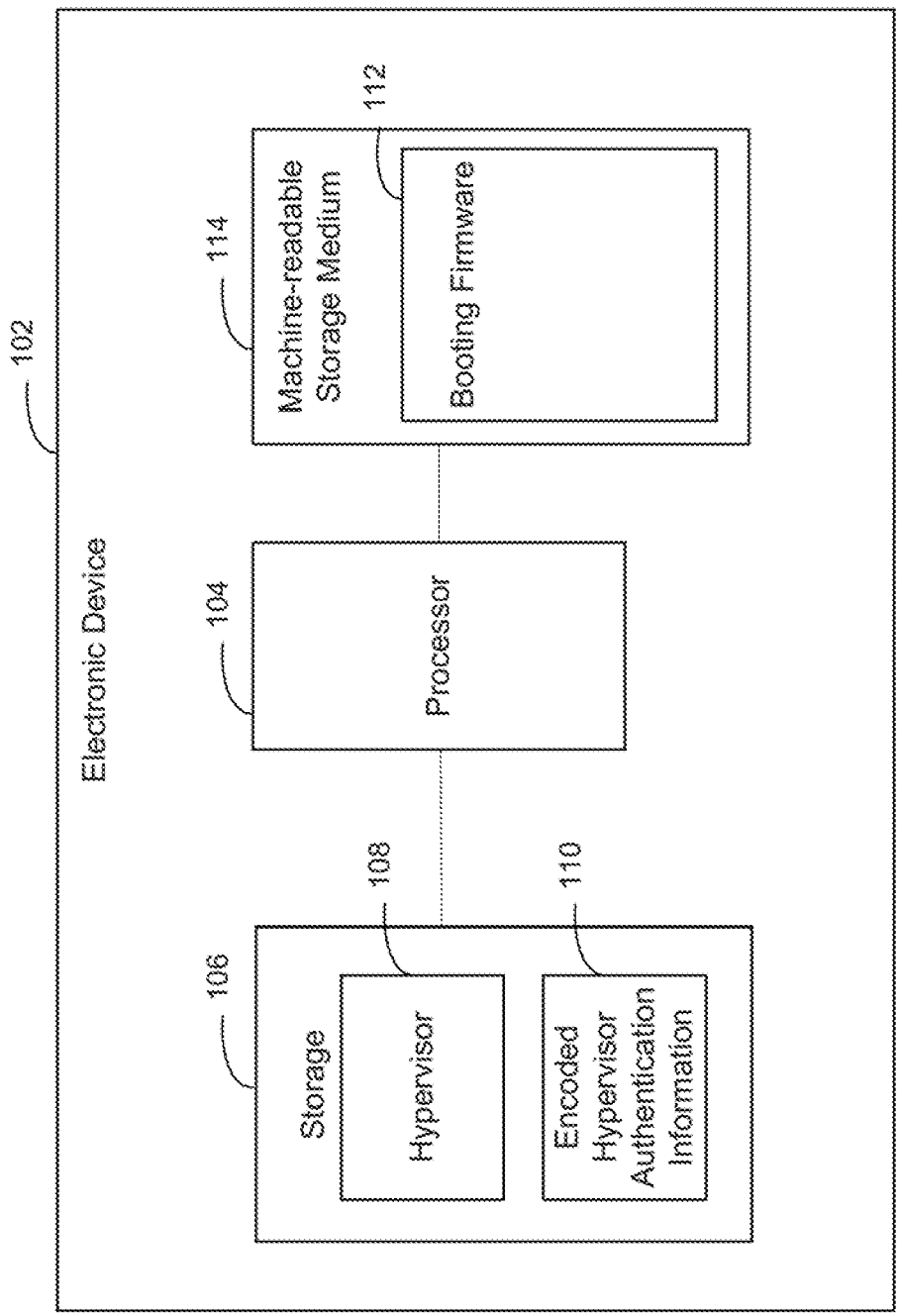
FIG. 1 is a block diagram illustrating one example of an electronic device.

Virtual machines may allow an electronic device to run multiple operating environments. For example, an electronic device may execute one virtual machine to communicate with a database and a second virtual machine for other work on the electronic device. A hypervisor for monitoring multiple virtual machines may run at a higher privilege level than an operating system because the hypervisor may launch a virtual machine that initiates an operating system. The higher privilege level may present security concerns. For example, a computer intruder may install a rogue hypervisor or may maliciously modify a legitimate hypervisor. Because the hypervisor runs at a higher privilege level than the operating system, the operating system may be unable to detect the security threat. A hypervisor security threat may be addressed, for example, by disabling virtualization such that an electronic device executes a single operating environment, or by storing the hypervisor in a location where it may receive firmware updates. However, these solutions limit the configuration options of an electronic device.

In one embodiment, an electronic device includes firmware for booting the electronic device, and the firmware includes instructions for authenticating a hypervisor during the boot process. For example, the electronic device may include encoded information, such as a digital signature, associated with an authentic hypervisor. During the boot process of the electronic device, the firmware may compare a retrieved hypervisor, such as a hypervisor stored in a disk partition, to the encoded information to determine if the hypervisor is the authentic hypervisor. If the hypervisor is authenticated, the electronic device may continue to boot the hypervisor. If the hypervisor is not the authentic hypervisor, such as where the hypervisor is a rogue hypervisor, the electronic device may, for example, terminate the boot process or provide an error message. In some embodiments, the firmware includes instructions to determine whether an authentic hypervisor has been modified, such as whether the configuration of a hypervisor is altered or whether a previous version of a hypervisor is launched. For example, the firmware may compare encoded version information to the version of a booting hypervisor or may compare encoded configuration information to the configuration of a booting hypervisor.

Using firmware to authenticate a hypervisor, hypervisor version, or hypervisor configuration during the boot process may prevent some hypervisor related security threats to an electronic device. For example, firmware instructions executed during the boot process of an electronic device may be more secure because the firmware booting instructions may be trusted computer code executed before other instructions, such as prior to a hypervisor being launched. Encoded data may be used to authenticate a hypervisor such that a rogue hypervisor is unlikely to be able to properly replicate the encoded data used to authenticate a booting hypervisor. On addition, authenticating a hypervisor during the boot process may allow a hypervisor to be authenticated without storing the hypervisor in a location were it may receive firmware updates. For example, a hypervisor stored in a disk partition may be authenticated.

FIG. 1 is a block diagram illustrating one example of an electronic device 102. The electronic device 102 may be any suitable electronic device, such as a server, personal computer, or mobile computing device. The electronic device 102 may include a processor 104, a storage 106, and machine-readable storage medium 114.

The processor 104 may be any suitable processor, such as a central processing unit (CPU), a semiconductor-based microprocessor, or any other device suitable for retrieval and execution of instructions. In one embodiment, the electronic device 102 includes logic instead of or in addition to the processor 104. As an alternative or in addition to fetching, decoding, and executing instructions, the processor 104 may include one or more integrated circuits (ICs) or other electronic circuits that comprise a plurality of electronic components for performing the functionality described below. In one implementation, the electronic device 102 includes multiple processors. For example, one processor may perform some functionality and another processor may perform other functionality.

The storage 106 may include a hypervisor 108 and encoded hypervisor authentication information 110. The hypervisor 108 may be any suitable virtual machine monitor. For example, the hypervisor 108 may run one or more virtual machines capable of executing on the electronic device 102. Each virtual machine may be associated with a separate operating environment. The hypervisor 108 may be initiated during the boot process of the electronic device 102.

The hypervisor 108 may be installed on the electronic device 102 at any suitable time, such as before or after a customer receives the electronic device 102. An authenticate hypervisor may be provided, for example, prior to sending the electronic device 102 to a customer. In some cases, a user may install a hypervisor and indicate that it is a trusted hypervisor. The hypervisor 108 launched during the boot process may be the authentic hypervisor or a different hypervisor, such as a rogue hypervisor. In some implementations, there may be multiple authentic hypervisors.

The storage 106 may include encoded hypervisor authentication information 110. The encoded hypervisor authentication information 110 may be any suitable encoded information, such as a hash value or digital signature, used to determine whether the hypervisor 108 is an authentic hypervisor. The encoded hypervisor authentication information 110 may be stored in the same storage as the hypervisor 108 or in a separate storage from the hypervisor 108. The encoded hypervisor authentication information 110 may be stored at any suitable time. For example, a customer may receive the electronic device 102 with an authentic hypervisor and encoded hypervisor authentication information 110 related to the authentic hypervisor. In some cases, the encoded hypervisor authentication information 110 is a digital signature of the hypervisor 108, and the digital signature is verified with a public key. The digital signature may be created at any suitable time, such as prior to or during the boot process of the electronic device 102.

The processor 104 may launch the hypervisor 108 during the boot process. The hypervisor 108 may be an authentic or malicious hypervisor. Even though an authentic hypervisor was loaded onto the electronic device 102, a malicious hypervisor may also be installed on the electronic device 102. For example, the hypervisor 108 may be a malicious hypervisor designed to replace an authentic hypervisor. However, the encoded hypervisor authentication information 110 may be related to an authentic hypervisor such that a comparison of the encoded hypervisor authentication information 110 to the malicious hypervisor 108 may reveal that the malicious hypervisor 108 is not the authentic hypervisor. If the hypervisor 108 is not an authentic hypervisor, the processor 104 may, for example, terminate the boot processor or provide an error message.

The electronic device 102 may include a machine-readable storage medium 114. The machine-readable storage medium 114 may be any suitable machine readable medium, such as an electronic, magnetic, optical, or other physical storage device that stores executable instructions or other data (e.g., a hard disk drive, random access memory, flash memory, etc.). The machine-readable storage medium 114 may be, for example, a computer readable non-transitory medium. The machine-readable storage medium 114 may include booting firmware 112. The machine-readable storage 114 medium may include instructions executable by the processor 104, such as instructions associated with the booting firmware 112.

The booting firmware 112 may be any suitable firmware. The booting firmware 112 may include, for example, instructions and settings related to booting the electronic device 102. The booting firmware 112 may include instructions executed by the processor 104 to boot the electronic device 102. The booting firmware 112 may include, for example, Basic Input Output System instructions (BIOS) or Uniform Extensible Firmware Interface (UEFI) instructions. The booting firmware 112 may be stored in any suitable storage, such in a Read-only Memory (ROM), Programmable Read-only Memory (PROM), Erasable Programmable Read-only Memory (EPROM), or flash memory.

The booting firmware 112 may include instructions to compare the encoded hypervisor authentication information 110 to a hypervisor being launched, such as the hypervisor 108, to determine if the hypervisor 108 is an authentic hypervisor. For example, the booting firmware 112 may include instructions to determine whether a received virtual machine monitor, such as the hypervisor 108, is a valid virtual machine monitor based on the stored encoded authentication information 110, and if determined that the received virtual machine monitor is not the valid virtual machine monitor, perform one of ending the boot process or providing an error message.

In some cases, a software update may be run to update the hypervisor 108 or to install a new hypervisor 106, and the booting firmware 112 may confirm that the updated hypervisor 108 is an authorized hypervisor the next time the electronic device 102 boots. The booting firmware may check other aspects of the updated hypervisor during the boot process, such as the configuration or version of the hypervisor. In one embodiment, the booting firmware 112 includes instructions executed when updating the stored hypervisor 108. For example, the booting firmware 112 may compare the updated hypervisor to the encoded hypervisor authentication information 110 before storing the updated hypervisor for later use by the electronic device 102. For example, the booting firmware 112 may determine whether an updated hypervisor signed with a private key may be verified using a public key stored on the electronic device 102. If the updated hypervisor is not verified, the updated hypervisor, for example, may not be stored for future use. In some cases, the booting firmware 112 may check other aspects of the updated hypervisor, such as the version or configuration of the hypervisor, to confirm that the updated hypervisor conforms to particular policies. The check may prevent a malicious update to a hypervisor prior to hooting the electronic device 102 with the updated hypervisor.

Figure 2:
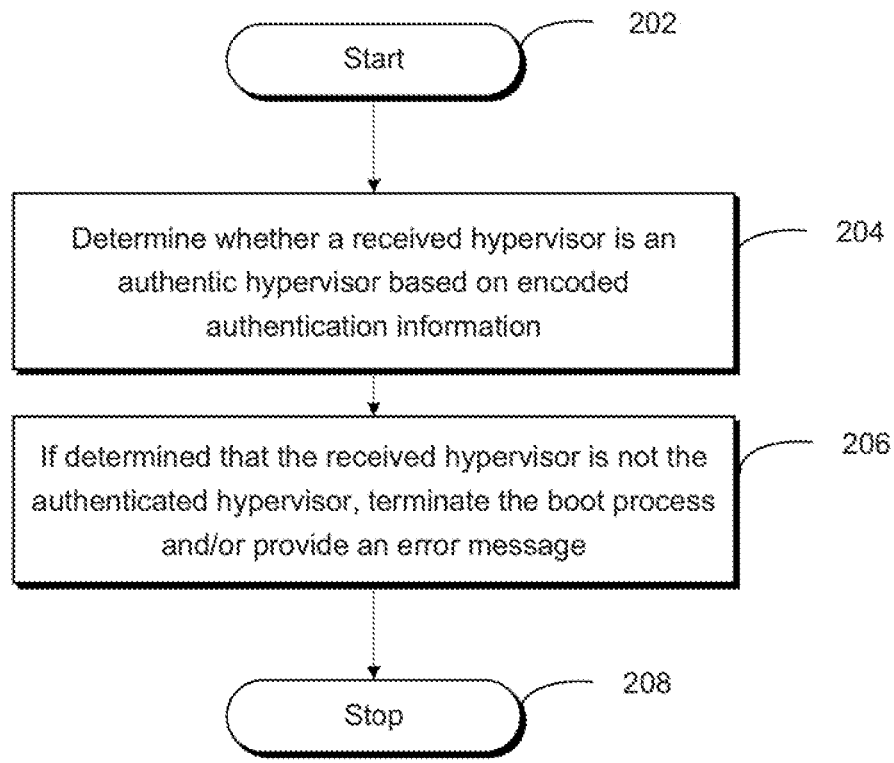
FIG. 2 is a flow chart illustrating one example of a method to authenticate a hypervisor.

FIG. 2 is a flow chart illustrating one example of a method 200 to authenticate a hypervisor. A hypervisor may be stored on an electronic device. The hypervisor may be received during the boot process of the electronic device, and the firmware may include instructions to determine whether the received hypervisor is the authentic hypervisor based on the encoded hypervisor authentication information. If the received hypervisor is the authentic hypervisor, the firmware may continue the boot process. If the received hypervisor is not the authentic hypervisor, such as because a malicious hypervisor is installed, the firmware may, for example, terminate the boot process or provide an error message. The method 200 may be executed, for example, on the electronic device 102.

Beginning at 202 and moving to 204, the processor, such as by executing instructions in firmware during the boot process of an electronic device, determines whether a received hypervisor, such as the hypervisor 108, is an authentic hypervisor based on encoded hypervisor authentication information. The processor may be any suitable processor, such as a central processing unit (CPU). In one embodiment, the processor is the processor 104. The processor may execute firmware, such as Basic Input Output System (BIOS) or Uniform Extensible Firmware Interface (UEFI) firmware, for booting the electronic device.

The hypervisor may be any suitable virtual machine monitor. The hypervisor may be an authentic or a malicious hypervisor. The hypervisor may be received in any suitable manner. For example, the firmware may include instructions for retrieving and launching a hypervisor found in the storage. In some cases, the firmware may check a setting to see if virtualization is enabled before launching the hypervisor.

The firmware may determine whether the hypervisor is a valid hypervisor in any suitable manner. For example, the encoded hypervisor authentication information may be encoded information related to an authentic hypervisor, and the firmware may determine whether the encoded hypervisor authentication information corresponds to the hypervisor. In some cases, the comparison may depend on the type of firmware, such as whether the firmware is Basic Input Output System (BIOS) firmware or Uniform Extensible Firmware Interface (UEFI) firmware.

In one embodiment, the encoded hypervisor authentication information is related to the booting hypervisor. For example, the encoded hypervisor authentication information may be a digital signature of the hypervisor. The firmware may evaluate the digital signature of the hypervisor to determine if the hypervisor is authentic.

Continuing to block 206, if determined that the received hypervisor is not the authentic hypervisor, the processor, such as by executing instructions stored in the firmware, performs at least one of terminating the boot process of the electronic device or providing an error message. For example, the processor may end the boot process of the electronic device such that the electronic device does not boot an operating system and is not able to be used. In some cases, the processor may display an error message on a display device associated with the electronic device indicating that the hypervisor is not the authentic hypervisor instead of or in addition to terminating the boot process. A user may terminate the boot process in response to the error message.

If determined that the hypervisor is the authentic hypervisor, the processor may continue to execute the instructions in the firmware to complete the boot process of the electronic device. The firmware may launch the hypervisor which may execute a virtual machine on the electronic device. After the boot process is complete, the electronic device may be ready for use. The method 200 continues to 208 to end.

Figure 3:
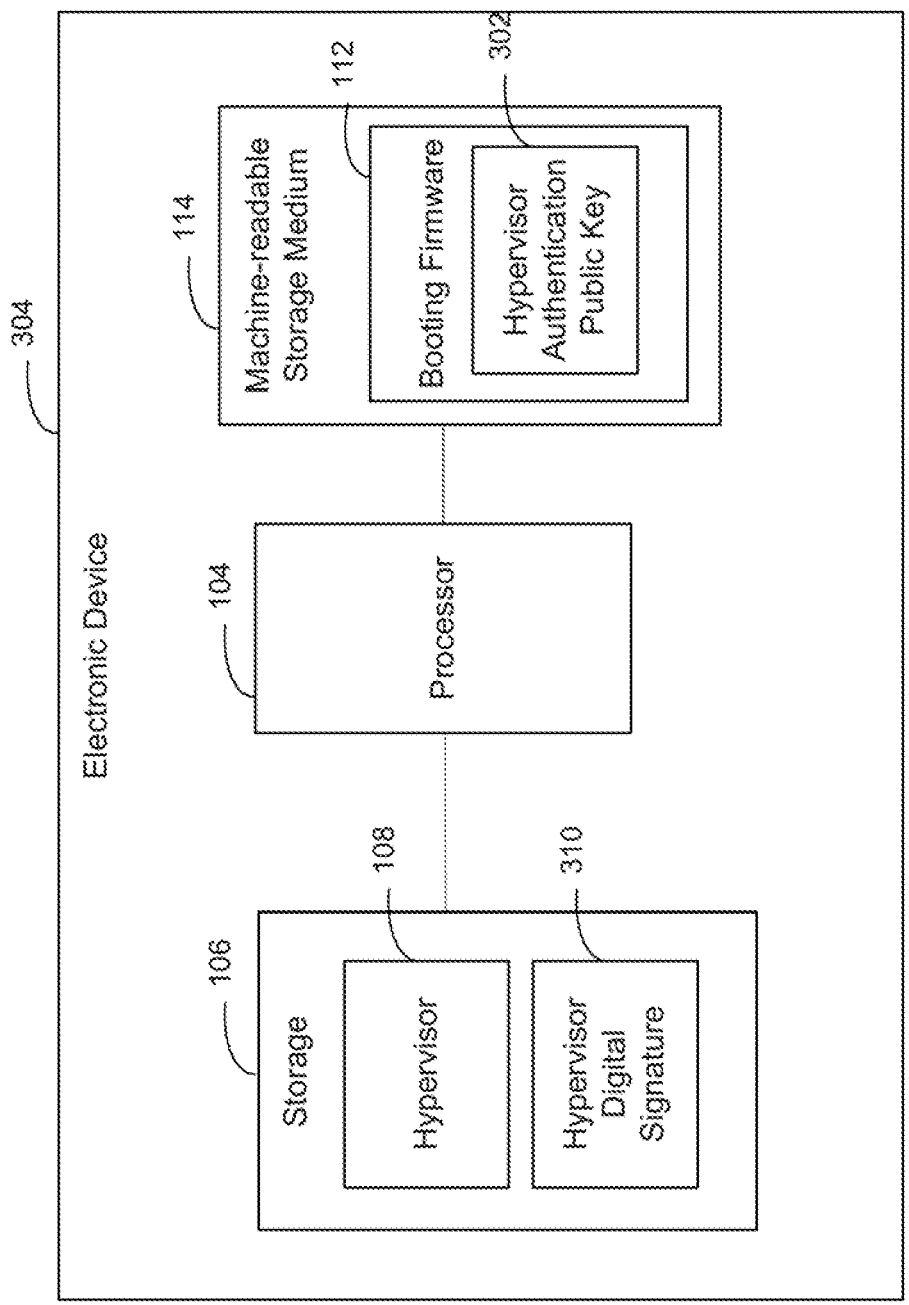
FIG. 3 is a block diagram illustrating one example of an electronic device.

FIG. 3 is a block diagram illustrating one example of an electronic device 304. The electronic device 304 may be, for example, a server, desktop, notebook, or mobile computing device. The electronic device 304 may include the processor 104, the storage 106, the machine-readable storage medium 114, and the booting firmware 112. The electronic device 304 illustrates en embodiment where the booting firmware 112 analyzes a digital signature of the hypervisor 108. For example, when an authentic hypervisor is installed, hash values may be created based on the authentic hypervisor, and the hash values may be signed with a private key, such as a private key available to the manufacturer that is not stored on the electronic device 304. The encoded hypervisor authentication information 110 may be the hypervisor digital signature 310 created with the private key. The hypervisor digital signature 310 may be, for example, a digital signature of a hash value related to a boot loader and hypervisor component files associated with an authentic hypervisor.

An authentic hypervisor public key 302 may be a corresponding public key for decrypting a digital signature created with the correct private key. The authentic hypervisor public key 302 may be stored when an authentic hypervisor is installed for later use in determining whether a received hypervisor is authentic. For example, the hypervisor public key 302 may be stored in the booting firmware 112. A rogue hypervisor may be digitally signed when installed, but the digital signature may not be verifiable by the hypervisor public key 302 if the digital signature was not performed with the correct private key.

During the boot process of the electronic device 304, the booting firmware 112 may attempt to decrypt the hypervisor digital signature 310 with the authentic hypervisor public key 302. For example, the booting firmware 112 may verify a digital signature of hash values associated with the hypervisor boot loader and hypervisor component files stored in a particular location related to the hypervisor 108. If the hypervisor digital signature 310 does not exist or if the hypervisor digital signature 310 is not capable of being decrypted with the authentic hypervisor authentic key 302, the hypervisor 108 may be a malicious hypervisor.

Figure 4:
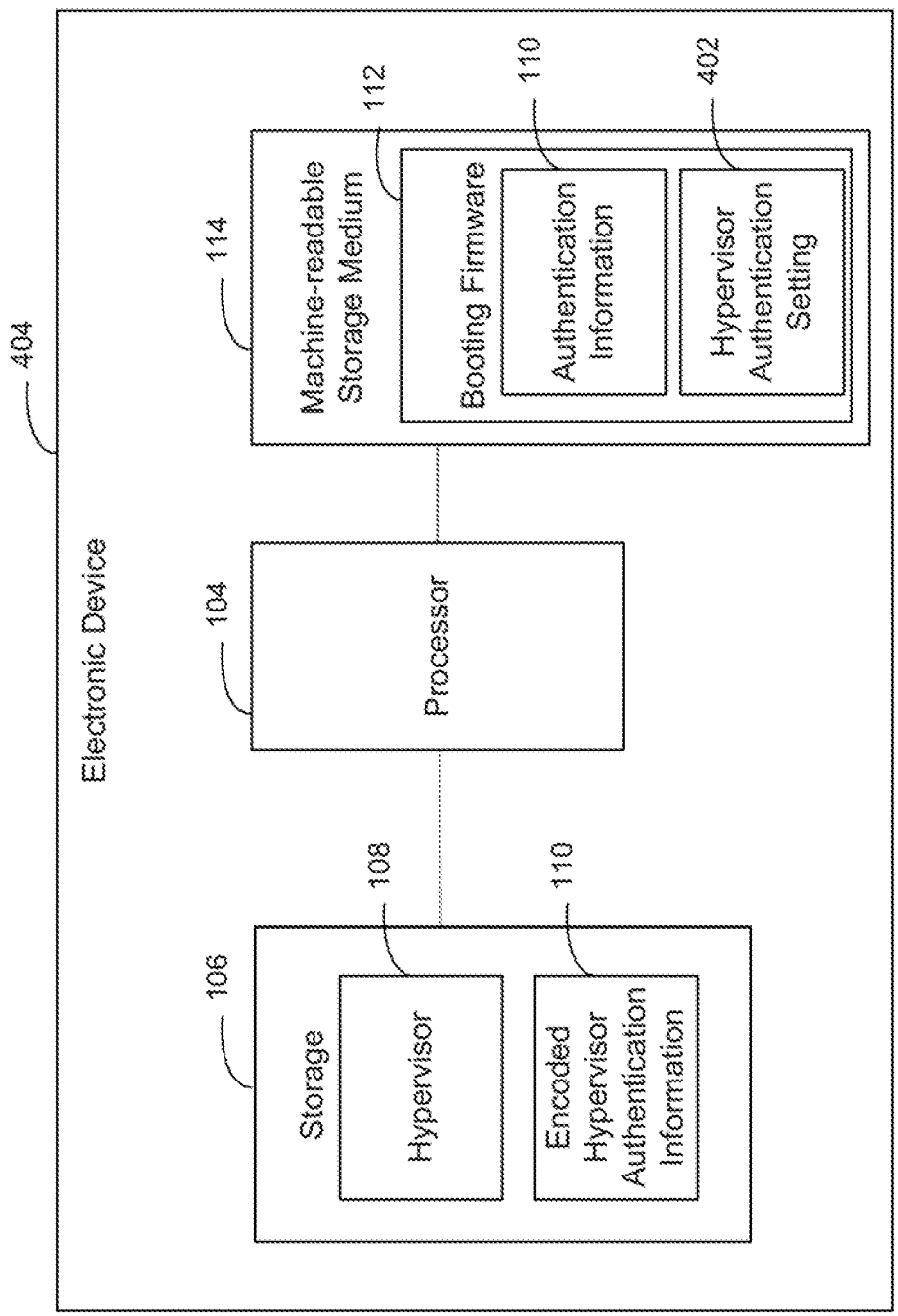
FIG. 4 is a block diagram illustrating one example of an electronic device.

FIG. 4 is a block diagram illustrating one example of an electronic device 404. The electronic device 404 may include the storage 106, the processor 104, the machine-readable storage medium 114, and the booting firmware 112. The booting firmware 112 may include a hypervisor authentication setting 402. The hypervisor authentication setting 402 may indicate whether the authentication of the hypervisor 108 should be checked. For example, a user may select to disable the hypervisor authentication capabilities. The hypervisor authentication setting 402 may, for example, be enabled to indicate that the authentication of the hypervisor 108 should be checked and disabled to indicate that the authentication of the hypervisor 108 should not be checked. In some cases, a warning may be may be provided to the user if the hypervisor authentication setting 402 is disabled. When the processor 104 executes the booting firmware 112 instructions to boot the electronic device 404, the booting firmware 112 may include instructions to check the hypervisor authentication setting 402 to determine whether the processor 104 should check whether the hypervisor 108 is authentic.

Figure 5:
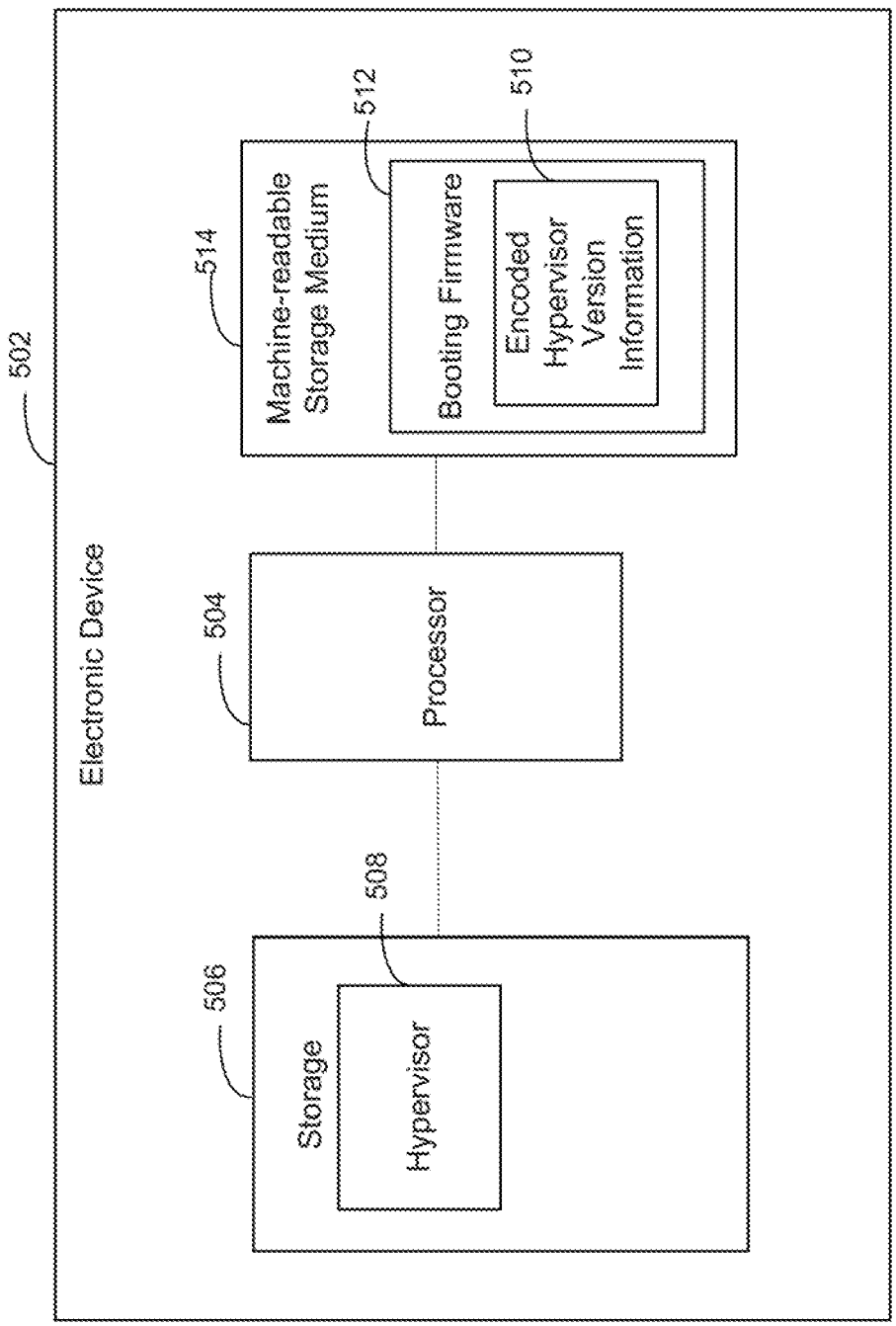
FIG. 5 is a block diagram illustrating one example of an electronic device.

FIG. 5 is a block diagram illustrating one example of an electronic device 502. The electronic device 502 may include a storage 506, a processor 504, and a machine-readable storage medium 514. The electronic device 502 may be any suitable electronic device, such as a server, personal computer, or mobile computing device.

The processor 504 may be any suitable processor, such as a central processing unit (CPU), a semiconductor-based microprocessor, or any other device suitable for retrieval and execution of instructions. In one embodiment, the electronic device 502 includes logic instead of or in addition to the processor 504. The processor 504 may include one or more integrated circuits (ICs) or other electronic circuits that comprise a plurality of electronic components for performing the functionality described below.

The storage 506 may include a hypervisor 508. The hypervisor 508 may be any suitable virtual machine monitor. For example, the hypervisor 508 may run one or more virtual machines capable of executing on the electronic device 502. The hypervisor 508 may be initiated during the boot process of the electronic device 502 by the processor 504.

The electronic device 102 may include a machine-readable storage medium 514. The machine-readable storage medium 514 may be any suitable machine readable medium, such as an electronic, magnetic, optical, or other physical storage device that stores executable instructions or other data (e.g., a hard disk drive, random access memory, flash memory, etc.). The machine-readable storage medium 514 may be for example, a computer readable non-transitory medium. The machine-readable storage medium 514 may include booting firmware 512.

The booting firmware 512 may be any suitable firmware. The booting firmware 512 may include, for example, instructions and settings related to booting the electronic device 502. The booting firmware 512 may include instructions executed by the processor 504 to boot the electronic device 502. The booting firmware 512 may include, for example, Basic Input Output System instructions (BIOS) or Uniform Extensible Firmware Interface (UEFI) instructions.

The booting firmware 512 includes stored encoded hypervisor version information 510. The booting firmware 512 may use the encoded hypervisor version information 510 to determine whether the booting hypervisor 508 is the correct version of the authentic hypervisor.

The encoded hypervisor version information 510 may be any suitable hypervisor version information related to the version of the authentic hypervisor. The encoded hypervisor version information 510 may indicate, for example, to use a specific version, to use the most recent version, or to use any version after a specific version. The encoded hypervisor version information 510 may be a hash value indicating a desired version of the authentic hypervisor. For example, the encoded hypervisor version information 510 may be a concatenated hash value, such as a Secure Hash Algorithm (SHA) or Secure Hash Algorithm-1 (SHA1), of component files of the authentic hypervisor.

The encoded hypervisor version information 510 may be stored in the electronic device 502 during the manufacture of the electronic device 502 prior to shipping it to a customer. In some cases, a user may prompt the electronic device 502 to create and store the encoded hypervisor version information 502. For example, a user may install an updated version of a hypervisor, and the electronic device 502 may create or update the encoded hypervisor version information 510. In some cases, there may be some security used to ensure that the version hash is being changed by a reputable source. For example, the encoded hypervisor version information 510, such as a hash value, may be cryptographically signed by key, such as an RSA key, and a firmware password may be supplied.

Figure 6:
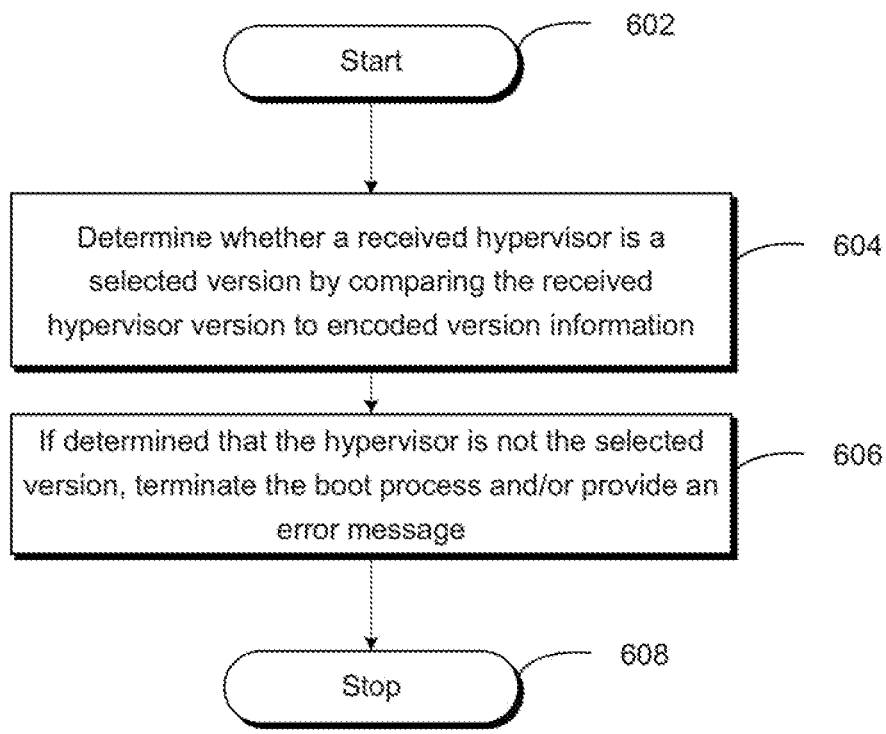
FIG. 6 is a flow chart illustrating one example of a method to authenticate a version of a hypervisor.

FIG. 6 is a flow chart illustrating one example of a method 600 for authenticating a version of a hypervisor. For example, firmware may determine whether a received hypervisor is the intended version of an authentic hypervisor. The version check may be done, for example, to protect against vulnerability in a previous version that may be exploited. If the hypervisor is not the selected version, the boot process may be ended or an error message may be provided. The method 600 may be executed, for example, by the electronic device 502.

Beginning at 602 and moving to 604, a processor, such as by executing firmware during the boot process of an electronic device, determines whether a received hypervisor is a selected version by comparing the received hypervisor version to encoded version information, such as the encoded hypervisor version information 510. The processor may be any suitable process, such as a central processing unit (CPU). The version of the hypervisor may be determined in any suitable manner. The processor may compare the compare the encoded hypervisor version information to the version of the hypervisor in any suitable manner. For example, the processor may evaluate a version encoded in a hash value and compare it to the version of the hypervisor. In one embodiment, the processor compares hash values associated with known good values associated with the authentic hypervisor components files to hash values created from the component files of the hypervisor to determine if the hash values associated with the hypervisor are found in the group of known good hash values.

Continuing to 606, if determined that the hypervisor is not the selected version, the processor, such as by executing instruction stored in the firmware, performs at feast one of terminating the boot process or providing an error message. For example, the processor may end the boot process if the hypervisor is not the selected version to prevent any problems with another version from being exploited. In one embodiment, the processor displays an error message indicating that the booting hypervisor is not a selected version of an authentic hypervisor in addition to or instead of terminating the boot process. A user may terminate the boot process in response to the error message. If determined that the hypervisor is in the selected version, the processor may continue to execute instructions stored in the firmware to complete the boot process of the electronic device. The method 500 continues to 608 to end.

Figure 7:
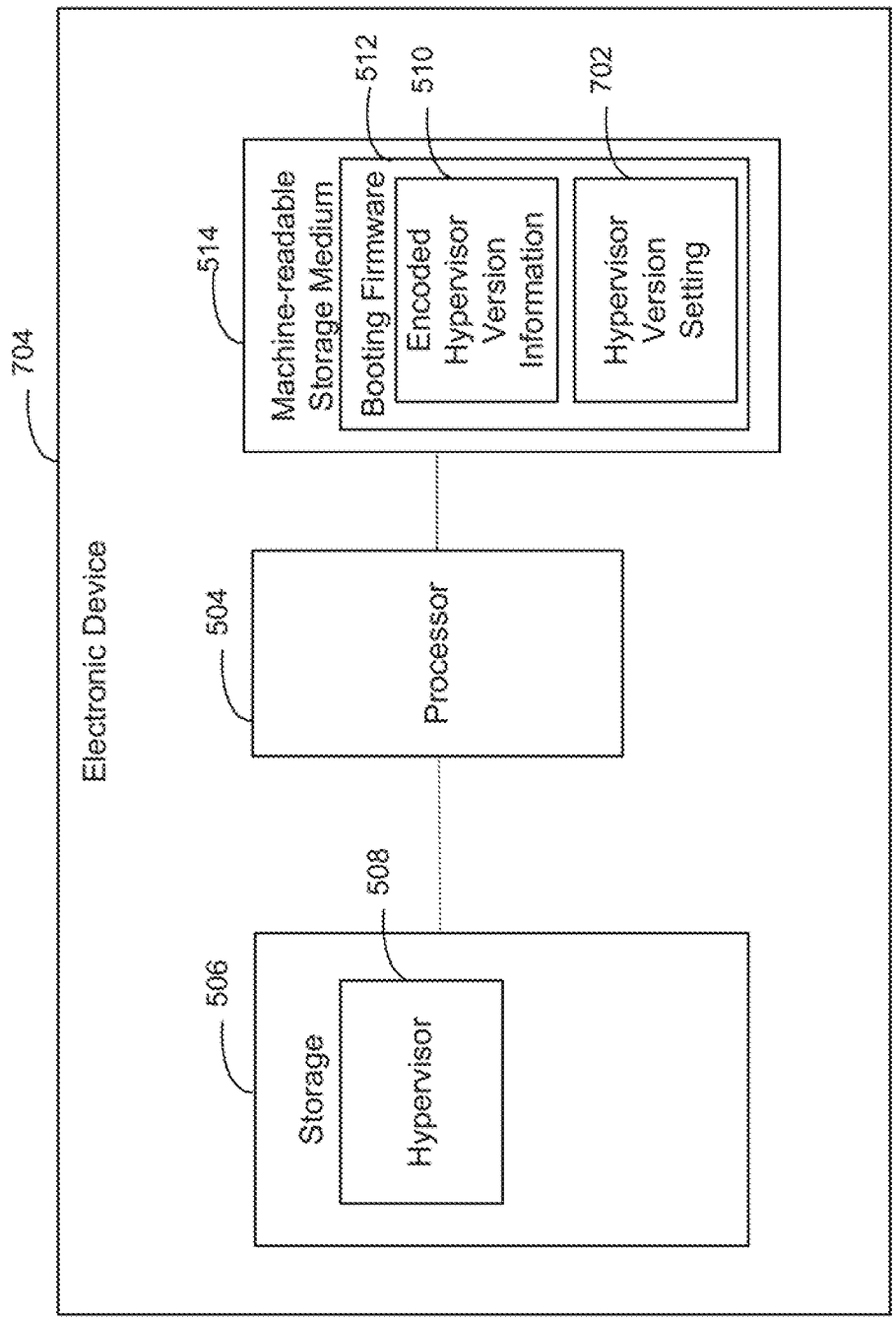
FIG. 7 is a block diagram illustrating one example of electronic device.

FIG. 7 is a block diagram illustrating one example of an electronic device 704. The electronic device 704 may include the storage 506, the processor 504, the machine-readable storage medium 514, and the booting firmware 512. The booting firmware 512 may include the encoded hypervisor version information 510 and a hypervisor version setting 702. The hypervisor version setting 702 may be a setting indicating whether the version of the hypervisor 508 should be checked during the boot process of the electronic device 502. The booting firmware 512 may include instructions to check hypervisor version setting 702 when booting the electronic device 502. The hypervisor version setting 702 may be enabled or disabled when the electronic device 502 is shipped to a customer. In some cases, a customer may enable or disable the hypervisor version setting 702, such as through a user interface.

Figure 8:
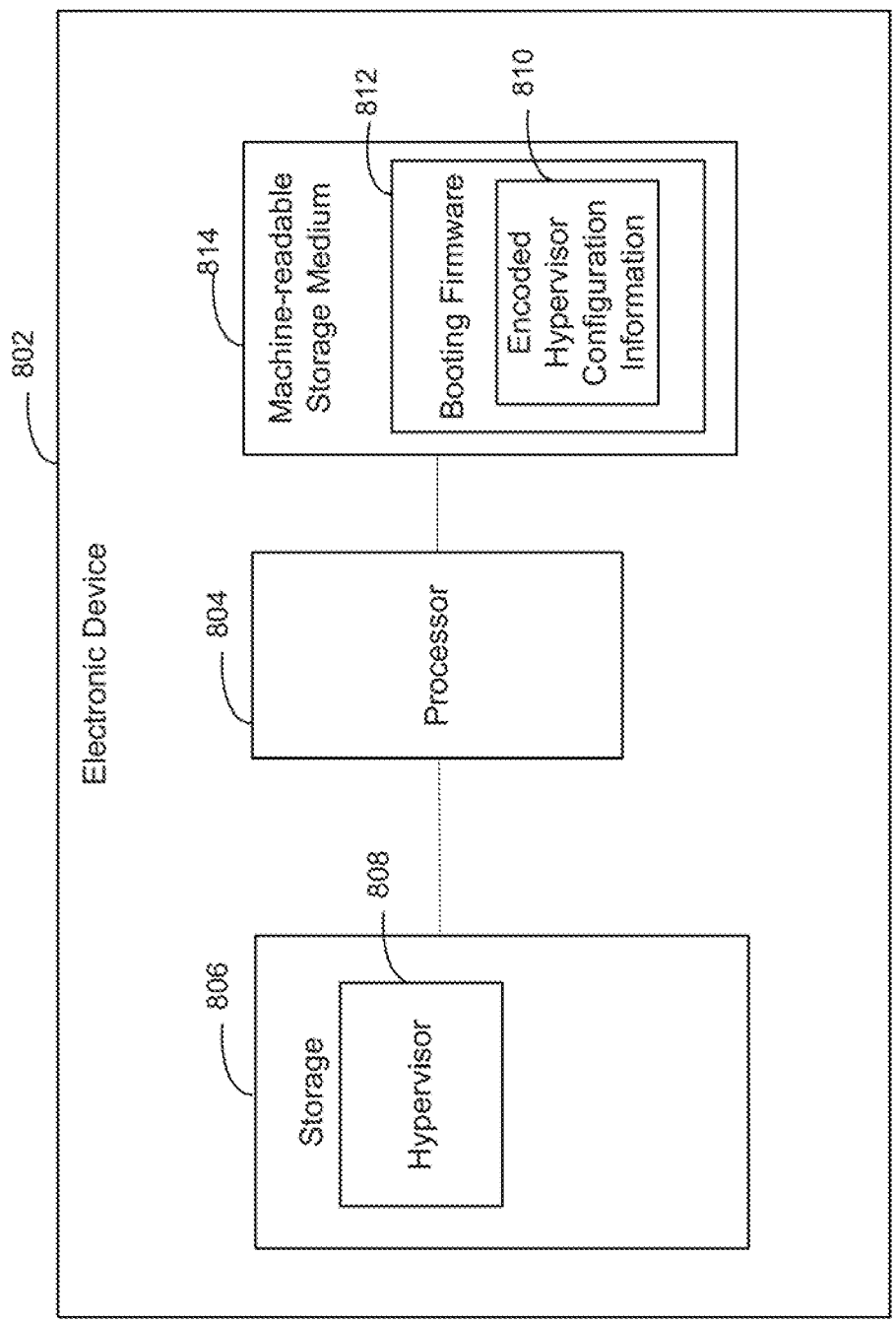
FIG. 8 is a block diagram illustrating one example of an electronic device.

FIG. 8 is a block diagram illustrating one example of an electronic device 802. The electronic device 802 may include the storage 806, the processor 804, and a machine-readable storage medium 814. The processor 804 may be any suitable processor, such as a central processing unit (CPU), a semiconductor-based microprocessor, or any other device suitable for retrieval and execution of instructions. In one embodiment, the electronic device 802 includes logic instead of or in addition to the processor 804. The storage 806 may include a hypervisor 808. The hypervisor 808 may be any suitable virtual machine monitor. The hypervisor 808 may be initiated by the processor 804 during the boot process of the electronic device 802 by the processor 804.

The electronic device 802 may include a machine-readable storage medium 814. The machine-readable storage medium 814 may be any suitable machine readable medium, such as an electronic, magnetic, optical, or other physical storage device that stores executable instructions or other data (e.g., a hard disk drive, random access memory, flash memory, etc.). The machine-readable storage medium 814 may be, for example, a computer readable non-transitory medium. The machine-readable storage medium 814 may include booting firmware 812. The booting firmware 812 may be any suitable firmware. The booting firmware 812 may include, for example, instructions and settings related to hooting the electronic device 802. The booting firmware 812 may include, for example, Basic Input Output System if (BIOS) or Uniform Extensible Firmware Interface (UEFI) instructions.

The booting firmware 812 may include encoded hypervisor configuration information 810. The encoded hypervisor configuration information 810 may be used to verify that the booting hypervisor 808 is in a selected configuration. Verifying the configuration of the hypervisor 808 may prevent a security threat caused by a malicious configuration of the hypervisor 808, such as an authentic hypervisor configured to launch a malicious virtual machine.

The encoded hypervisor configuration information 810 may be any suitable information indicating a selected configuration of a hypervisor. For example, the encoded hypervisor configuration information 810 may be a hash value related to configuration files a an authentic hypervisor. The authentic hypervisor may be configured, and information related to the configuration may be saved in the encoded hypervisor configuration information 810. For example, the booting firmware 812 may determine the configuration of the authentic hypervisor and create the encoded hypervisor configuration information 810 based on the configuration. The encoded hypervisor configuration information 810 may be stored in any suitable location, such as in the booting firmware 812. The encoded hypervisor configuration information 810 may include any suitable configuration information related to the configuration of the authentic hypervisor. For example, the configuration information may include information about a list of specific virtual machines, encryption, a network interface, or which resources are allocated to each virtual machine.

The encoded hypervisor configuration information 810 may be stored in the booting firmware 812 at any suitable time, such as during the manufacturing process. In some embodiments, a user may configure the hypervisor and indicate that the configuration should be encoded. In one embodiment, the encoded hypervisor configuration information 810 may be updated. For example, it may be desirable to add the ability for a hypervisor to launch an additional virtual machine.

Figure 9:
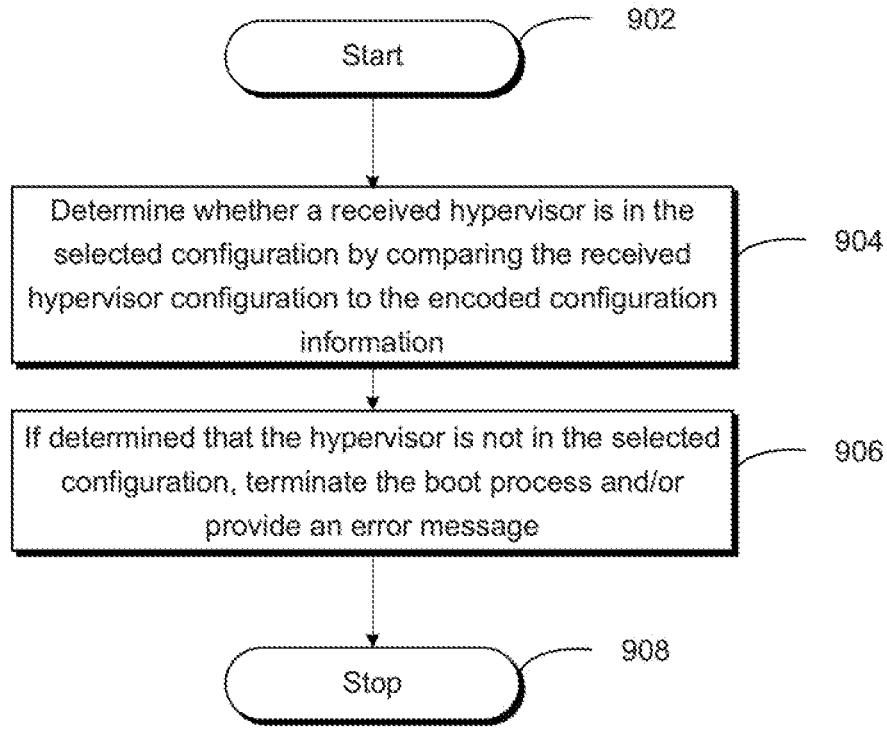
FIG. 9 is a flow chart illustrating one example of a method to authenticate a configuration of a hypervisor.

FIG. 9 is a flow chart illustrating one example of a method 900 to authenticate a configuration of a hypervisor. For example, firmware may include instructions to compare the configuration of the hypervisor to encoded hypervisor configuration information to determine whether the configuration of the hypervisor is the selected configuration. If the hypervisor is not in the selected configuration, it may indicate that the hypervisor was maliciously modified, such as to execute a different virtual machine or not to use encryption. The firmware may terminate the boot process or create an error message if the hypervisor is not determined to be in the selected configuration. The method 900 may be executed, for example, by the electronic device 802.

Beginning at 902 and moving to 904, the processor, such as by executing firmware for booting an electronic device, determines whether a received hypervisor is in the selected configuration by comparing the received hypervisor configuration to encoded hypervisor configuration information. The hypervisor configuration may be compared to the encoded hypervisor information in any suitable manner. For example, the encoded hypervisor configuration information may be hash values related to configuration settings that may be compared to the configuration of the hypervisor, or may be hash values of hypervisor files that may be compared to a hash value of the component files of the hypervisor.

Continuing to 906, if determined that the hypervisor is not ire the selected configuration, the processor, such as by executing instructions stored in the firmware, performs at least one of terminating the boot process or providing an error message. For example, the electronic device may not boot, and as a result, a user may be unable to use the electronic device. In one embodiment, an error message is provided, such as displayed or sent to another device to display, to indicate that the booting hypervisor is not in the selected configuration. If determined that the hypervisor is in the selected configuration, the processor may continue to execute instructions in the firmware to complete the boot process. The electronic device may then be ready for use. The method 900 continues to 908 to end.

Figure 10:
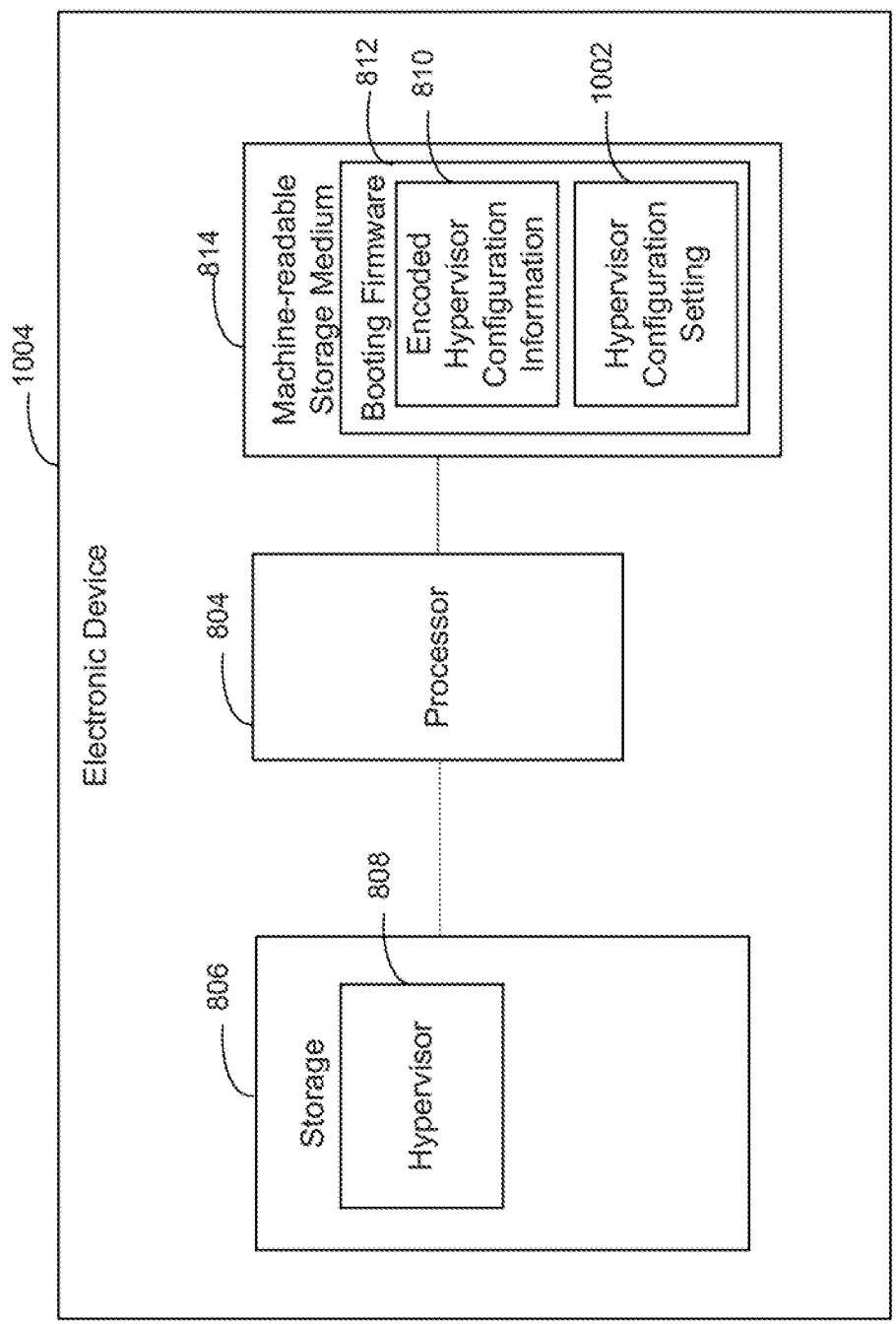
FIG. 10 is a block diagram illustrating one example of an electronic device.

FIG. 10 is a block diagram illustrating one example of an electronic device 1004. The electronic device 1004 may include the storage 806, the processor 804, and the booting firmware 812. The booting firmware 812 includes a hypervisor configuration setting 1002. The hypervisor configuration setting 1002 may be any suitable setting indicating whether the configuration of the hypervisor 808 should be checked. For example, a configuration may be selected, and the encoded hypervisor configuration information 1002 may be stored in the booting firmware 812. A user may then decide that the configuration should not be evaluated. The hypervisor configuration setting 1002 may be disabled such that the processor 804 no longer checks the configuration of a hypervisor during the boot process. In one embodiment, a user may update the hypervisor configuration setting 1002 via a user interface displayed by the electronic device 1004.

In one embodiment, the same electronic device may authenticate one of a hypervisor, hypervisor configuration, and a hypervisor version or any combination of the three, such as authenticating the hypervisor and the hypervisor version, the hypervisor configuration and the hypervisor version, or authentication the hypervisor and the hypervisor configuration. For example, the functionality of the electronic devices 102, 502, and 802 may be combined. Authenticating more than one feature of a hypervisor may provide a more secure authentic device.

Figure 11:
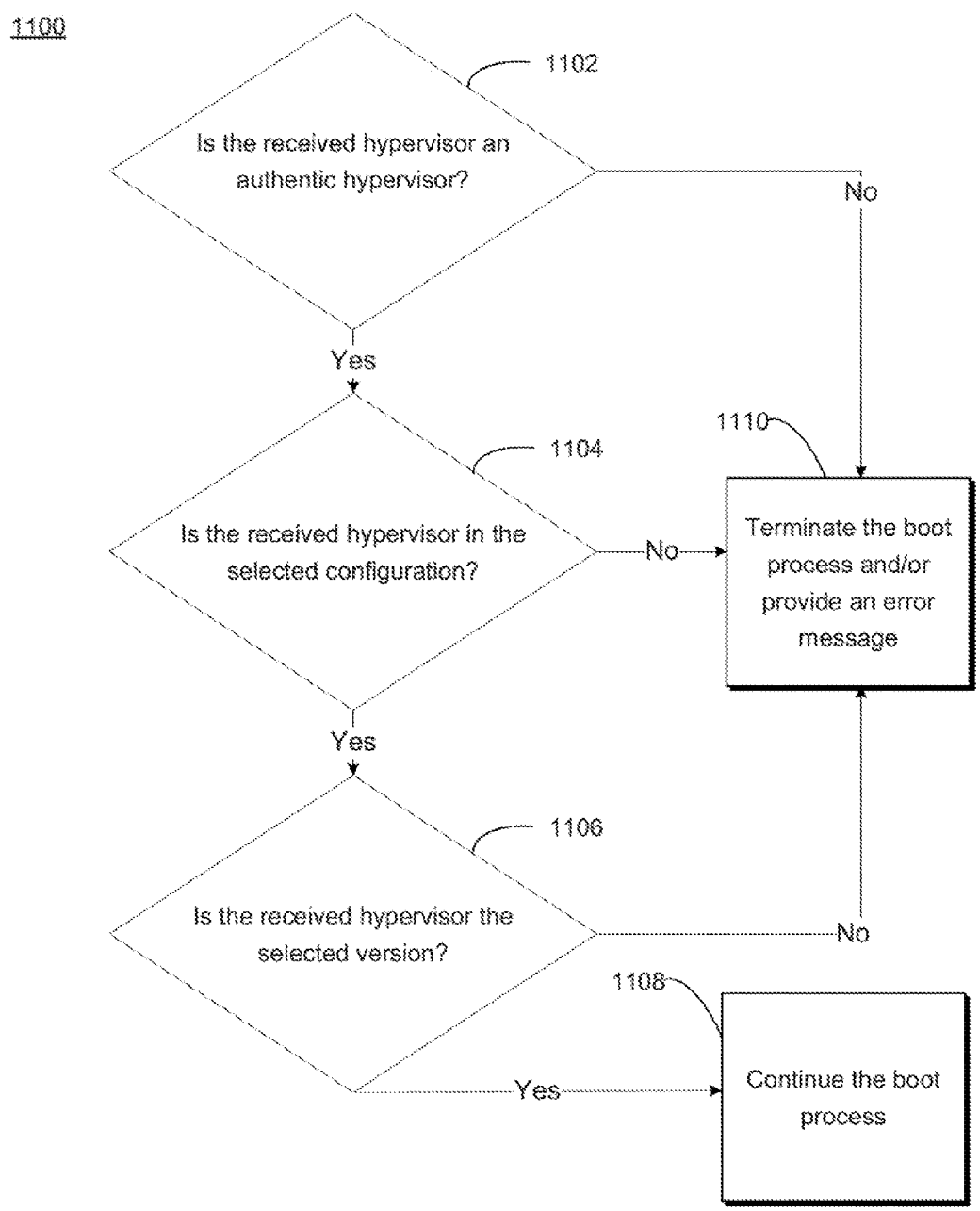
FIG. 11 is a flow chart illustrating one example of a method to authenticate a hypervisor, a hypervisor configuration, and a hypervisor version.

FIG. 11 is a flow chart illustrating one example of a method 1100 to authenticate a hypervisor, a hypervisor configuration, and a hypervisor version. For example, an electronic device may include multiple types of encoded information related to a hypervisor. The three may be authenticated in any suitable order.

Beginning at block 1102, a processor determines whether a received hypervisor is the authentic hypervisor. If not, moving to 1110, the processor terminates the boot process, displays an error message, or both. If the received hypervisor is the authentic hypervisor, continuing to 1104, the processor determines whether the received hypervisor is in the selected configuration. If not, the processor continues to 1110 to terminate the boot process, display an error message, or both. If the hypervisor is in the correct configuration, the processor continues to 1106 to determine whether the hypervisor is the selected version. If not, the processor moves to 1110 to terminate the boot processor, display an error message, or both. If the hypervisor is the selected version, the processor moves to 1108 to continue the boot process. For example, the hypervisor may be determined to be an authentic hypervisor of the correct version and configuration.

Executing firmware instructions to authenticate a hypervisor during the boot process of an electronic device may prevent a hypervisor related security threat. For example, the authentication may be performed by trusted firmware code and take place early in the booting process before malicious code has an opportunity to execute.

The invention claimed is:

1. An electronic device for authenticating a hypervisor, comprising:
   a first memory resource to store a hypervisor;
   a second memory resource to store a hypervisor digital signature associated with a boot loader for the electronic device, wherein the second memory resource is separate from the first memory resource;

a third memory resource to store firmware for the hypervisor, wherein the firmware includes instructions related to a boot process of the electronic device; and a processor to execute the instructions to:

access the hypervisor and the hypervisor digital signature to perform one or more authentication operations during the boot process to authenticate the hypervisor, wherein the authentication is performed with the hypervisor stored in a location where the hypervisor is incapable of being updated during the boot process; and perform at least one of terminating the boot process or providing an error message when the hypervisor is determined to be not authentic.

2. The electronic device of claim 1, wherein authenticating the hypervisor comprises verifying the hypervisor digital signature with a public key.

3. The electronic device of claim 1, wherein the firmware comprises a setting indicating whether to determine if the hypervisor is authentic.

4. The electronic device of claim 1, wherein the instructions further cause the processor to:

determine whether the hypervisor is in a selected configuration by comparing a configuration of the hypervisor to encoded configuration information; and perform at least one of terminating the boot process or providing an error message when it is determined that the hypervisor is not in the selected configuration.

5. The electronic device of claim 4, wherein the firmware comprises a setting indicating whether to determine if the hypervisor is in the selected configuration.

6. The electronic device of claim 1, wherein the instructions further cause the processor to:

determine whether the hypervisor is a selected version by comparing the hypervisor version to encoded version information; and if determined that the hypervisor is not the selected version, perform at least one of terminating the boot process or providing an error message.

7. The electronic device of claim 6, wherein the firmware comprises a setting indicating whether to determine if the hypervisor is the selected version.

8. A method for authenticating a hypervisor, comprising:

accessing a hypervisor digital signature for a hypervisor on an electronic device, wherein the hypervisor digital signature and the hypervisor are stored in separate memory resources and the hypervisor digital signature is associated with a boot loader for the electronic device;

accessing firmware for the hypervisor, wherein the firmware includes instructions related to a boot process of the electronic device;

determining, by a processor executing the instructions during the boot process, whether the hypervisor is authentic based on the hypervisor digital signature, wherein the authentication is performed with the hypervisor stored in a location where the hypervisor is incapable of being updated during the boot process; and performing, by the processor, at least one of terminating the boot process or providing an error message when it is determined that the hypervisor is not authentic.

9. A non-transitory machine-readable storage medium encoded with instructions executable by a processor to authenticate a hypervisor, comprising instructions to:

access a hypervisor digital signature for a hypervisor on an electronic device, wherein the hypervisor digital signature and the hypervisor are stored in separate memory resources and the hypervisor digital signature is associated with a boot loader for the electronic device;

access firmware for the hypervisor, wherein the firmware includes firmware instructions related to a boot process of the electronic device;

determine, by the processor executing the firmware instructions during the boot process, whether the hypervisor is authentic based on the hypervisor digital signature, wherein the authentication is performed with the hypervisor stored in a location where the hypervisor is incapable of being updated during the boot process; and perform, by the processor, at least one of terminating the boot process or providing an error message when it is determined that the hypervisor is not authentic.

* * * * *